(12) United States Patent
von Sebo et al.

(10) Patent No.: US 10,411,624 B2
(45) Date of Patent: Sep. 10, 2019

(54) SWITCHING TRANSIENT DAMPER METHOD AND APPARATUS

(71) Applicant: ABB SCHWEIZ AG, Baden (CH)

(72) Inventors: Joseph von Sebo, New Berlin, WI (US); Peter M. Stipan, Wind Lake, WI (US); Trevor E. Deacon, New Berlin, WI (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/692,693

(22) Filed: Aug. 31, 2017

(65) Prior Publication Data

US 2019/0068095 A1    Feb. 28, 2019

(51) Int. Cl.
*H02P 7/06* (2006.01)

(52) U.S. Cl.
CPC ..................... *H02P 7/06* (2013.01)

(58) Field of Classification Search
CPC ........................................................ H02P 7/06
USPC ........................................................ 318/802
See application file for complete search history.

(56) References Cited

U.S. PATENT DOCUMENTS

| | | |
|---|---|---|
| 2,246,926 A | 6/1941 | Roman |
| 3,668,507 A | 6/1972 | Kadomsky et al. |
| 3,894,274 A | 7/1975 | Rosenberry, Jr. |
| 4,063,306 A | 12/1977 | Perkins et al. |
| 4,494,163 A | 1/1985 | Yelland et al. |
| 4,527,185 A | 7/1985 | Philofsky et al. |
| 4,638,238 A | 1/1987 | Gyugyi et al. |
| 4,862,341 A | 8/1989 | Cook |
| 5,374,853 A | 12/1994 | Larsen et al. |
| 5,532,897 A | 7/1996 | Carpenter, Jr. |
| 5,686,806 A | 11/1997 | Hibbard |
| 5,831,410 A | 11/1998 | Skibinski |
| 5,990,654 A | 11/1999 | Skibinski et al. |
| 6,304,013 B1 | 10/2001 | Akers et al. |
| 7,050,279 B2 | 5/2006 | Nojima |
| 7,848,122 B2 * | 12/2010 | Tallam ................. H02M 1/126 307/105 |
| 8,004,129 B2 | 8/2011 | Schrepfer et al. |
| 8,139,383 B2 * | 3/2012 | Efraimsson ............... H02J 3/00 361/107 |

(Continued)

FOREIGN PATENT DOCUMENTS

WO    2017018811 A1    2/2017

OTHER PUBLICATIONS

Leggate et al., Reflected Waves and Their Associated Current, IEEE Industry Applications Society, St. Louis MO, Oct. 12-16, 1998 (10 pages).

(Continued)

*Primary Examiner* — Kawing Chan
(74) *Attorney, Agent, or Firm* — Taft Stettinius & Hollister LLP; J. Bruce Schelkopf

(57) ABSTRACT

The present application is directed to a method and apparatus operable to damp reflected voltage transients in an electric motor drive system. The system includes an inverter, an electrical cable having at least one conducting cable connected to the inverter, and an electric motor connected to the electrical cable. An inner shield is disposed along a length of the at least one conducting cable. A ground line is operable for connecting the inner shield to a ground location through a resistor connected in series therewith.

25 Claims, 4 Drawing Sheets

(56) References Cited

U.S. PATENT DOCUMENTS

| | | | |
|---|---|---|---|
| 8,319,466 B2 | 11/2012 | Valdez et al. | |
| 9,269,477 B2* | 2/2016 | Sato | H01B 11/1895 |
| 9,621,094 B2* | 4/2017 | Vrankovic | H02P 27/06 |
| 2012/0014143 A1* | 1/2012 | Schueneman | H02M 1/126 363/40 |
| 2012/0068655 A1* | 3/2012 | Inuduka | H02M 1/126 318/494 |
| 2012/0146437 A1 | 6/2012 | Kernahan | |
| 2012/0187894 A1* | 7/2012 | Higuchi | H02M 1/126 318/811 |
| 2015/0145463 A1 | 5/2015 | Vrankovic et al. | |

OTHER PUBLICATIONS

Texiera et al., Protecting Submersible Motors from the Effects of PWM Voltage, presented at the 2009 Brazil Conference for Quality of Electric Energy (6 sheets).
Saunders et al., Riding the Reflected Wave—IGBT Drive Technology Demands New Motor and Cable Considerations, presented at IEEE IAS—Petroleum & Chemical Industry Conference, Philadelphia, PA, Sep. 23-25, 1996, pp. 75-84 (10 pages).
Skibinski et al., Reflected Wave Modeling Techniques for PWM AC Motor Drives, published IEEE 1998 (9 pages).
ABB Group, The Truth about Cable Lead Lengths From Your Drive to Your Motor, PowerPoint presentation Mar. 23, 2014 (23 pages).

\* cited by examiner

SWITCHING TRANSIENT DAMPER METHOD AND APPARATUS

TECHNICAL FIELD

The present application generally relates to a method and apparatus for damping voltage transients generated by switching; for example power semiconductor switching typically found in variable frequency drives, soft-starter systems, and any power electronic systems.

BACKGROUND

High speed power semiconductor switching in variable frequency motor drive (VFD), soft motor starting systems, and power electronic systems do not generate sinusoidal output voltage waveforms, but instead generate a continuous train of high frequency pulses. These voltage pulses are transmitted to the motor terminals through the motor cables connected to the variable frequency motor drive. Peak pulse voltage at the converter terminal is equal to the drive DC bus magnitude (VDCbus) and contains a steep fronted rise and fall times [PWM] controlled by a semi-conductor switch device such as an Insulated Gate Bipolar Transistor (IGBT) or the like. The peak pulse voltage at the motor terminals is typically not VDCbus, but is dependent on the transfer characteristics of the entire circuit including the converter, conductor, and the load. The load terminal voltage phenomenon is sometimes called "transmission line effect", "reflected electromagnetic waves", or "standing electromagnetic waves."

The peak voltage pulse can be defined in terms of a ratio of the peak line motor voltage to peak line bus voltage. In some systems, per unit (pu) voltage can be up to 2 or greater at certain lengths of cable regardless of the type of output switching device. High frequency reflected transients are generated when the surge impedance of the converter(s), cable(s) and motor(s) are not matched. If not attenuated, the generated voltage transients can damage the insulation in the electrical system.

One cause of over-voltages at drive and motor terminals is voltage reflections. Voltage reflections occur when characteristic impedances are mismatched and the traveling time of a transient along a transmission line is greater than one tenth of the transient's rise time, i.e., "electrically long." If this transient is not damped or otherwise attenuated, it will produce an over-voltage at the mismatch. In addition, the mismatch can produce standing waves in the transmission line.

Most power electronic inverters transmit power as differential mode content. This means that the sum of the power frequency currents is essentially zero. However, switching typically appears as common mode content. Since the sum of the three phase voltages or currents are not equal to zero, the return path is through the common mode path which is the cable shield, cable drain wire, or the earth.

Present solutions for attenuating high frequency transients include large, heavy and costly low pass filters such as sine wave filters to prevent reflected waves. Accordingly, there remains a need for further contributions in this area of technology.

SUMMARY

One embodiment of the present application is a unique system configured to damp high frequency voltage transients in a motor drive system. Other embodiments include apparatuses, systems, devices, hardware, methods, and combinations for a high frequency transient damping system that operates by terminating a cable shield to a grounded resistor. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
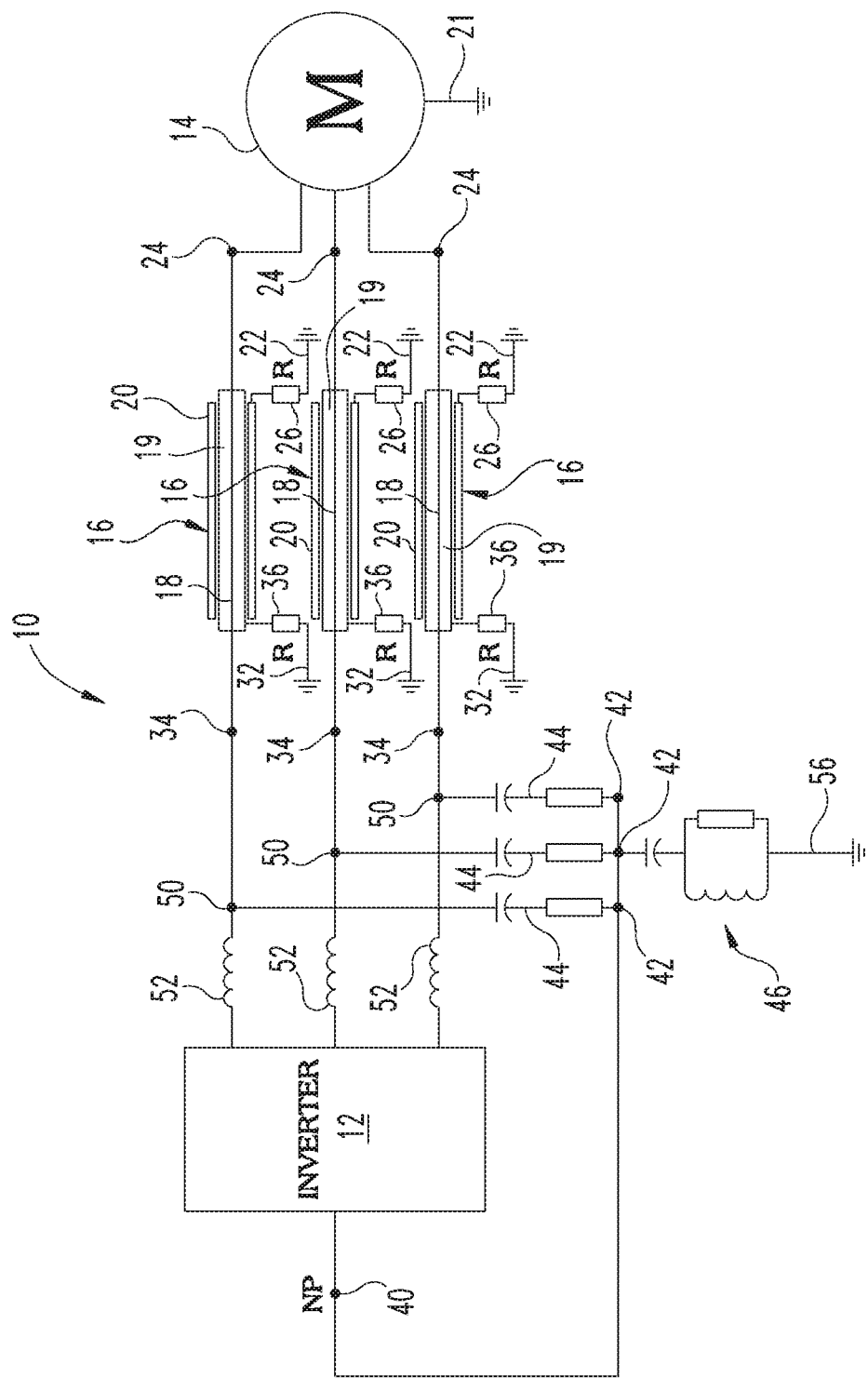
FIG. 1 is a schematic view of an exemplary embodiment for an electrical motor drive system operable to reduce transient reflected high frequency electromagnetic waves.

For the purposes of promoting an understanding of the principles of the application, reference will now be made to the embodiments illustrated in the drawings and specific language will be used to describe the same. It will nevertheless be understood that no limitation of the scope of the application is thereby intended. Any alterations and further modifications in the described embodiments, and any further applications of the principles of the application as described herein are contemplated as would normally occur to one skilled in the art to which the application relates.

Referring to FIG. 1, a schematic view of an electrical system 10 according to one exemplary embodiment is disclosed. The electrical system 10 can include a variable frequency drive (VFD) 12 such as an inverter or the like. An electric motor 14 is operably connected to the VFD 12 through one or more conducting cables 16. It should be noted that while the disclosed embodiment illustrates an electric motor, other electrical components such as electrical switch gear or circuit breakers may be substituted and remain within the teachings of the present disclosure. Furthermore, the term electric motor as recited in the claims, should be understood to include electric switch gear and/or circuit breakers. In the disclosed embodiment, three conducting cables 16 are operable to direct three-phase power to the motor 14. In other forms, a different number of conducting cables 16 may direct electric power to the motor 14. The conducting cables 16 can include a conductor 18 operable for conducting electrical power from the VFD 12 to the electric motor 14. The conductor 18 can be formed from any material conducive to transmit an electrical current flow at relatively low resistance. In some forms, the conductor can be a metal or a metal alloy and may include multiple wires as known to one skilled in the art. One or more layers of insulation 19 can be positioned about each conductor 18. The insulation layer(s) 19 are configured to prevent electrical current flow or current leakage from the conductor 18 as the current flows along the conductor 18 to the motor 14. In some forms, the electric motor 14 can be grounded through a ground connector 21 as is conventional.

Each of the conducting cables 16 can include a shield 20 encasing the insulation 19 along at least a portion thereof. The shield 20 may be a conductor in some embodiments and a semi-conductor in other embodiments. Material selection for the shield 20 may include a metal, such as copper or stainless steel and the like, a metal alloy or a composite material. In some forms, a ground line 22 can be connected between the shield 20 and a ground proximate to a motor connection 24. The motor connection 24 is operable for electrically connecting the conducting cable 16 to the motor 14. A resistor 26 can be connected in series with the ground line 22 from each shield 20. The resistor 26 is operable for damping electromagnetic waves reflected from the electric motor 14. As explained previously, reflected transients are generated in the system 10 when the characteristic impedance of the electric motor 14, the conducting cables 16 and the VFD 12 are not matched and the transmission line is electrically long.

In some forms, a ground line 32 can be connected between the shield 20 and a ground proximate to a VFD connection 34. The VFD 34 connection is operable to electrically connect the VFD 12 to the conducting cables 16. A resistor 36 can be connected in series with the ground line 32 extending from each conducting cable 16. In some forms, each cable 16 may include both a motor ground line 22 and a VFD ground line 32 with resistors 26, 36, operably connected in series thereto. Similar to the resistor 26, the resistor 36 is operable for damping transients reflected from the electric motor 14 when the characteristic impedance of the electric motor 14, the conducting cables 16 and the VFD 12 are not closely matched. The resistors 26 and 36 can be specifically designed for a particular electrical system 10 so as to maximize the damping effectiveness. In some forms, the resistors 26 and 36 may have a different electrical resistance value. Various forms of resistors may be used and remain within the teachings herein. By way of example and not limitation, thick film resistors mounted directly on a sheet metal part or ground bar may be used. In other forms, a ceramic wire-wound resistor may be mounted in series with a ground line 22 and/or 32. Other resistor types may be used as one skilled in the art would readily understand.

The electrical system 10 can include a neutral point connector 40, also known as a star point in a three phase system which can be tied to a neutral node in a three level convertor (not shown). In some forms, the neutral point connector 40 can electrically connect the inverter 12 to a filter connector 42 positioned between optional dv/dt and NP grounding filter 44, 46. In the exemplary embodiment each of the three conducting cables 16 includes a connection 50 configured to connect the dv/dt filter 44 to a corresponding conductor 18. An inductor 52 can be operably connected between the VFD 12 and each conducting cable 16. The VFD 12 can be connected to each of the conducting cables 16 through a connection 34. The dv/dt and NP grounding filter 44, 46 can be grounded through a ground connector 56.

Figure 2:
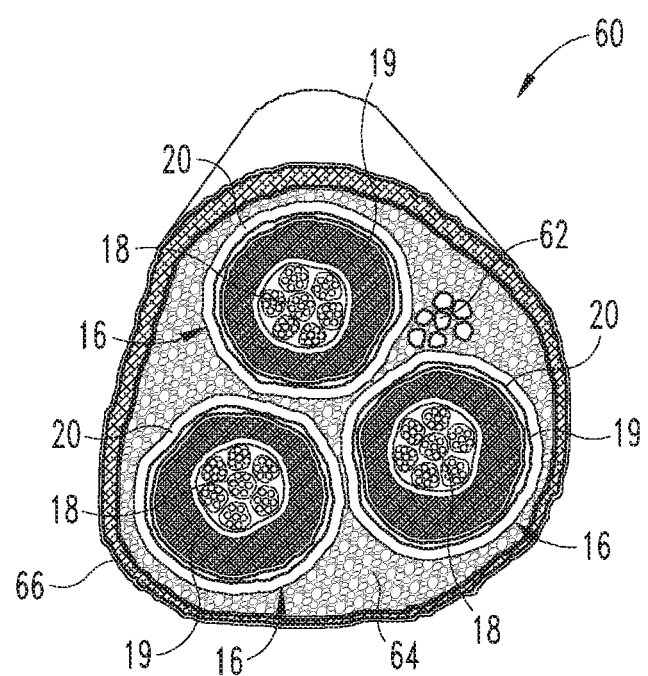
FIG. 2 is cross-sectional view of a portion of an exemplary three phase power cable for the electrical motor drive system of FIG. 1.

Referring now to FIG. 2, a cross sectional view of an exemplary three phase conducting cable 60 is illustrated. The three phase cable 60 includes three conducting cables 16. Each cable 16 includes a conductor 18 surrounded by insulation 19 and is at least partially wrapped by an inner shield 20. A cable ground conductor 62 can extend through the three phase conducting cable 60 along a longitudinal length thereof. An outer layer of insulation 64 surrounds the three conducting cables 16 and the ground conductor 62. An outer shield 66 covers the outer insulation layer 64 and the conducting cables 16. Although not shown, in some forms an additional protective outer layer can cover the outer shield 66.

Figure 3A:
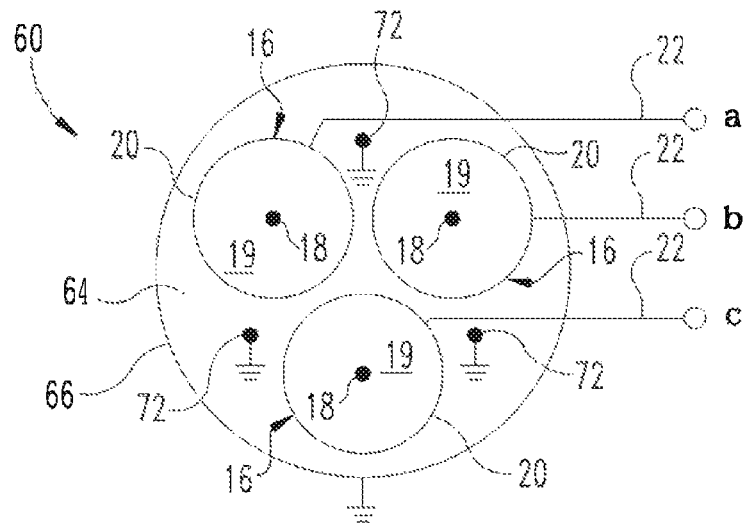
FIG. 3A is a schematic cross-sectional view of the power cable of FIG. 2.

Referring to FIG. 3A, a schematic cross-sectional view of an exemplary three phase conducting cable 60 includes three conductor cables 16. Each of the conducting cables 16 includes a conductor 18 surrounded by insulation 19 and an inner shield 20. Each of the inner shields 20 includes a ground line 22 operable for connecting to a ground. In some forms, a second ground line 32 (not shown) is also connected to each inner shield 20.

Each ground line 22 (and/or 32) can be connected to a connector point a, b or c, respectively. The three phase conducting cable 60 includes an outer insulation layer 64 surrounding the three conductor cables 16. The three phase conducting cable 60 can also include one or more ground conductors or drain wires 72 connected to a ground as schematically illustrated therein.

Figure 3B:
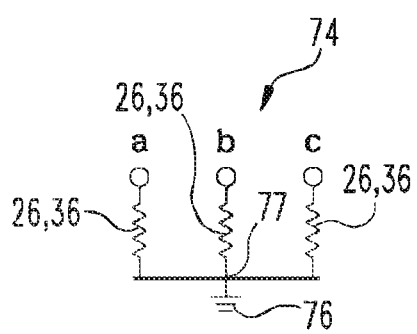
FIG. 3B is a schematic view of a three phase ground line connection circuit according to one embodiment of the present disclosure.
Figure 3C:
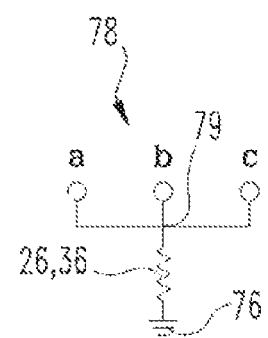
FIG. 3C is a schematic view of a three phase ground line connection circuit according to another embodiment of the present disclosure.

Referring now to FIG. 3B, a schematic view of one optional connection circuit 74 is shown. The connector points a, b and c can include a resistor 26 and/or 36 at either end of the conducting cable 16 as described previously in FIG. 1. The resistors 26 and/or 36 can be electrically connected at connection point 77 and then to a ground connection 76. FIG. 3C shows an alternate connection circuit 78 whereby each of the connectors a, b and c is electrically connected together at connection point 79 prior to connecting with a resistor 26 (and/or 36) in series and then to a ground connection 76.

Figures 4A, 4B, 4C:
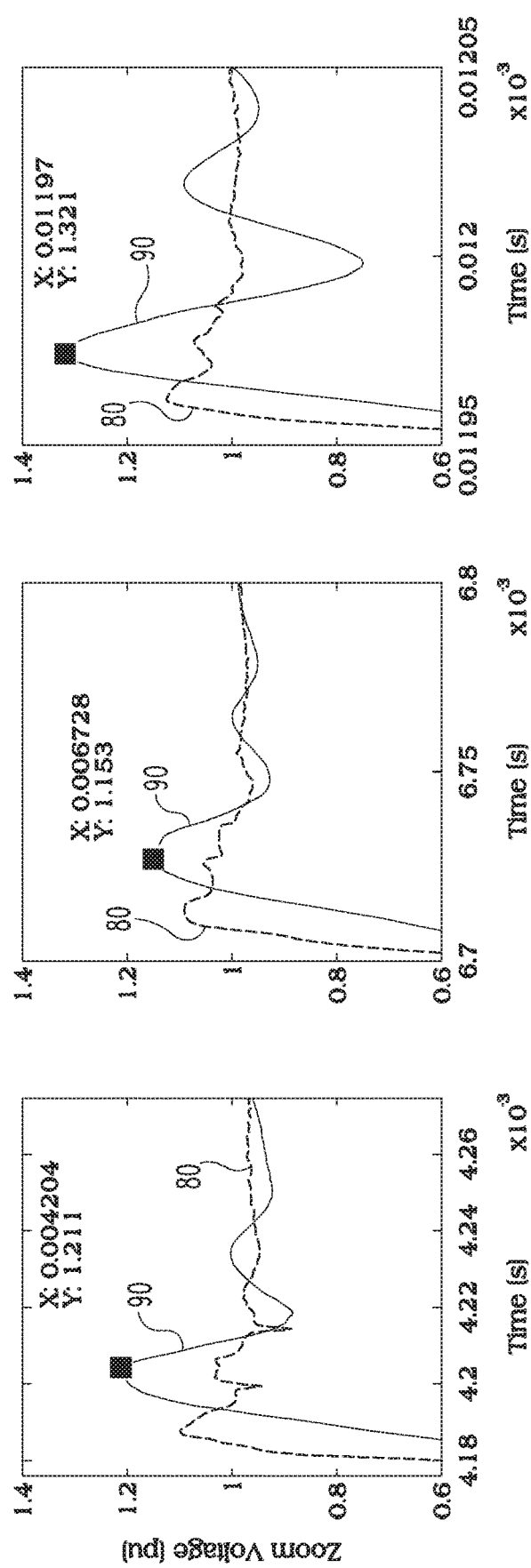
FIG. 4A illustrates an exemplary plot of transient voltage at the inverter and the electric motor terminal for a single switching event with a shield grounded through a resistor proximate to the inverter.
FIG. 4B illustrates an exemplary plot of transient voltage at the inverter and the electric motor terminal for a single switching event with a shield grounded through a resistor proximate the electric motor.
FIG. 4C illustrates an exemplary plot of transient voltage at the inverter and the electric motor terminal for a single switching event without a grounded resistor.

FIGS. 4A, 4B and 4C show comparison plots of exemplary experimental data inverter voltage (pu) 80 and simulated motor voltage (pu) 90 for a single switching event with different shield grounding configurations. FIG. 4A is a voltage trace in a system with a grounded resistor located at the inverter end of the shield and the motor end of the shield is left floating. FIG. 4B is a voltage trace in a system with a grounded resistor located at the motor end of the shield with the inverter end of the shield left floating. FIG. 4C is a voltage trace in a system wherein the shield is grounded at both ends, but does not have resistor connected in series with either ground line. The peak voltage at the motor is greater than the peak voltage at the inverter in each of the three configurations. However, the peak voltage at the motor is lower in FIGS. 4A and 4B due to the damping caused by the grounded resistors. The grounded resistors in FIG. 4A and FIG. 4B limit the peak motor voltage (pu) to 1.21 and 1.15, respectively, whereas FIG. 4C shows that motor voltage (pu) is 1.32 without a grounded resistor connected to the shield.

In one aspect, the present disclosure includes a system comprising an inverter; an electrical cable having at least one conducting cable connected to the inverter; an electric motor connected to the electrical cable; an inner shield disposed along a length of the at least one conducting cable; a ground line connecting the inner shield to a ground; and a resistor connected in series with the ground line.

In refining aspects, the system further comprises a second ground line connected between the inner shield and the ground; a second resistor connected in series with the second ground line; wherein the first ground line is positioned adjacent to the electric motor and the second ground line is positioned adjacent to the inverter; a sine filter electrically coupled between the inverter and the electrical cable; a dv/dt filter electrically coupled between the inverter and the electrical cable; wherein the electrical cable is a three phase electrical cable with three conducting cables for three phase power transmission; wherein the three phase electrical cable includes an insulation layer positioned about each of the conducting cables and a ground conductor insulated from the three conducting cables; an outer shield disposed around the ground conductor and three conducting cables; wherein each inner shield is formed from one of a conducting material and a semi-conducting material; and wherein an electrical resistance of the resistor is different than the electrical resistance of the second resistor.

Another aspect of the present disclosure includes a method for generating an electrical power; converting the electrical power to a desired voltage with an electrical converter; transmitting the electrical power through a conducting cable; receiving the electrical power with an electric motor, an electric switch gear and/or a circuit breaker; wrapping a shield about the electrical cable; grounding the shield with a ground connector line; and connecting a resistor to the ground connector line between the shield and ground.

In refining aspects, the method further comprises generating reflected voltage transients with the electrical converter; directing the reflected voltage transients from the shield to the resistor and into the ground; damping the reflected voltage transients through the shield with the grounding line and resistor; connecting a second resistor to a second ground line in series between the shield and the ground; directing the reflected electromagnetic waves from the shield through the second resistor and into the ground; damping the reflected electromagnetic waves with the second ground line and second resistor; transmitting three phase power through three conducting cables to the electric motor; transmitting reflected voltage transients from each of the three conducting cables to ground through a resistor connected to each shield; transmitting reflected voltage transients from each of the three conducting cables to ground through a second resistor connected to each shield; positioning the resister adjacent one of the electrical motor and electrical converter; and positioning the second resistor adjacent the other of the electric motor and the electrical converter.

Another aspect of the present disclosure includes a system comprising a variable frequency drive; an electric motor in electrical communication with the variable frequency drive; a conducting cable connected between the variable frequency drive and the electric motor; a shield coupled to the conducting cable; a ground line connected between the shield and a ground; and a resistor positioned in series with the ground line.

In refining aspects, the ground line directs reflected voltage transients from the shield and into ground after passing through the resistor; a second resistor positioned in series with a second ground line extending from the shield to ground; wherein the second ground line directs reflected high frequency voltage from the shield and into ground after passing through the second resistor; and a filter in electrical communication with the conducting cable.

While the application has been illustrated and described in detail in the drawings and foregoing description, the same is to be considered as illustrative and not restrictive in character, it being understood that only the preferred embodiments have been shown and described and that all changes and modifications that come within the spirit of the applications are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
   an inverter;
   an electrical cable having two or more conducting cables connected to the inverter;
   an electric motor connected to the electrical cable;
   two or more inner shields disposed along a length of respective ones of the two or more conducting cables, wherein each of the two or more inner shields is formed from one of a conducting material and a semi-conducting material that encases one or more layers of insulation around the respective one of the two or more conducting cables;
   a cable ground conductor extending longitudinally along the two or more conducting cables:
   an outer insulation layer around the two or more inner shields of the two or more conducting cables and the cable ground conductor;
   an outer shield around the outer insulation layer;
   a ground line extending from each of the inner shields from within the outer shield to connect each of the inner shields to a ground; and
   a resistor connected in series with the ground line.

2. The system of claim 1 further comprising a second ground line connected between each of the inner shields and the ground.

3. The system of claim 2 further comprising a second resistor connected in series with the second ground line.

4. The system of claim 3, wherein the first ground line is positioned adjacent to the electric motor and the second ground line is positioned adjacent to the inverter.

5. The system of claim 1 further comprising a filter electrically coupled between the inverter and the electrical cable.

6. The system of claim 1, wherein the electrical cable is a three phase electrical cable with three conducting cables for three phase power transmission.

7. The system of claim 6, wherein the three phase electrical cable includes an insulation layer positioned about each of the conducting cables; and
   a ground conductor insulated from the three conducting cables.

8. The system of claim 7, further wherein the outer shield is disposed around the ground conductor and the three conducting cables.

9. The system of claim 1, wherein an electrical resistance of the resistor is different than the electrical resistance of the second resistor.

10. A method comprising:
generating an electrical power;
converting the electrical power to a desired voltage with an electrical converter;
transmitting the electrical power through two or more conducting cables;
receiving the electrical power with an electric motor, an electric switch gear and/or a circuit breaker;
wrapping inner shields about respective ones of the two or more conducting cables, wherein each of the two or more inner shields is formed from one of a conducting material and a semi-conducting material that encases one or more layers of insulation around the respective one of the two or more conducting cables, and wrapping an outer shield around an outer insulation layer that extends about the inner shields and about a cable ground conductor that extends longitudinally along the two or more conducting cables;
grounding each of the inner shields with a ground connector line that extends from each of the two or more inner shields from within the outer shield to a ground; and
connecting a resistor to the ground connector line between the inner shields and ground.

11. The method of claim 10 further comprising generating reflected voltage transients with the electrical converter.

12. The method of claim 11 further comprising directing the reflected voltage transients from the inner shields to the resistor and into the ground.

13. The method of claim 12 further comprising damping the reflected voltage transients through the inner shields with the grounding line and the resistor.

14. The method of claim 10 further comprising connecting a second resistor to a second ground line in series between the inner shields and the ground.

15. The method of claim 14 further comprising:
positioning the resister adjacent one of the electrical motor and electrical converter; and
positioning the second resistor adjacent the other of the electric motor and the electrical converter.

16. The method of claim 14 further comprising directing the reflected voltage transients from the inner shields through the second resistor and into the ground.

17. The method of claim 16 further comprising damping the reflected voltage transients with the second ground line and second resistor.

18. The method of claim 10 further comprising transmitting three phase power through three conducting cables to the electric motor, each of the three conducting cables surrounded by a respective inner shield within the outer shield.

19. The method of claim 18 further comprising transmitting reflected voltage transients from each of the three conducting cables to ground through a resistor connected to each inner shield.

20. The method of claim 19 further comprising transmitting reflected voltage transients from each of the three conducting cables to ground through a second resistor connected to each inner shield.

21. A system comprising:
a variable frequency drive;
an electric motor in electrical communication with the variable frequency drive;
two or more conducting cables connected between the variable frequency drive and the electric motor;
two or more inner shields disposed along a length of respective ones of the two or more conducting cables, wherein each of the two or more inner shields is formed from one of a conducting material and a semi-conducting material that encases one or more layers of insulation around the respective one of the two or more conducting cables;
a cable ground conductor extending longitudinally along the two or more conducting cables:
an outer insulation layer around the two or more inner shields of the two or more conducting cables and the cable ground conductor;
an outer shield around the outer insulation layer;
a ground line connected extending from each of the inner shields from within the outer shield to a ground; and
a resistor positioned in series with the ground line.

22. The system of claim 21, wherein the ground line directs reflected high frequency voltage from the inner shields and into ground after passing through the resistor.

23. The system of claim 21 further comprising a second resistor positioned in series with a second ground line extending from each of the inner shields to ground.

24. The system of claim 23, wherein the second ground line directs reflected high frequency voltage from each of the inner shields and into ground after passing through the second resistor.

25. The system of claim 21 further comprising a filter in electrical communication with the conducting cable.

* * * * *